US009650273B2

(12) United States Patent
Jungbauer

(10) Patent No.: US 9,650,273 B2
(45) Date of Patent: May 16, 2017

(54) SYSTEMS AND METHODS FOR TREATING PRODUCED WATER

(71) Applicant: Michael James Jungbauer, East Bethel, MN (US)

(72) Inventor: Michael James Jungbauer, East Bethel, MN (US)

(*) Notice: Subject to any disclaimer, the term of this patent is extended or adjusted under 35 U.S.C. 154(b) by 0 days.

(21) Appl. No.: 14/036,680

(22) Filed: Sep. 25, 2013

(65) Prior Publication Data

US 2014/0083942 A1 Mar. 27, 2014

Related U.S. Application Data

(60) Provisional application No. 61/705,452, filed on Sep. 25, 2012.

(51) Int. Cl.
  *C02F 9/00* (2006.01)
  *C02F 3/34* (2006.01)
  *C02F 1/44* (2006.01)
  *C02F 1/78* (2006.01)
  *C02F 1/28* (2006.01)
  *C02F 1/24* (2006.01)
  *C02F 1/38* (2006.01)
  *C02F 1/40* (2006.01)
  *C02F 3/02* (2006.01)

(52) U.S. Cl.
  CPC ............... *C02F 9/00* (2013.01); *C02F 3/34* (2013.01); *C02F 1/24* (2013.01); *C02F 1/283* (2013.01); *C02F 1/38* (2013.01); *C02F 1/40* (2013.01); *C02F 1/441* (2013.01); *C02F 1/78* (2013.01); *C02F 3/02* (2013.01); *Y02W 10/15* (2015.05)

(58) Field of Classification Search
  CPC .. C02F 1/283; C02F 1/40; C02F 1/441; C02F 3/02; C02F 9/00; C02F 3/34
  USPC .......................................................... 210/620
  See application file for complete search history.

(56) References Cited

U.S. PATENT DOCUMENTS

| 395,218 | A | * | 12/1888 | Reed ..................... B23D 51/01 |
| | | | | 30/524 |
| 4,983,297 | A | * | 1/1991 | Kaczmarek et al. ......... 210/605 |
| 4,995,987 | A | * | 2/1991 | Whitekettle ........... A01N 59/00 |
| | | | | 210/754 |
| 5,135,656 | A | * | 8/1992 | Means et al. ................ 210/650 |
| 6,090,294 | A | * | 7/2000 | Teran ........................ C02F 1/78 |
| | | | | 210/141 |
| 7,655,149 | B1 | * | 2/2010 | Shaffer et al. ............... 210/691 |
| 8,137,565 | B2 | * | 3/2012 | Gong et al. .................. 210/693 |

(Continued)

*Primary Examiner* — Chester Barry
(74) *Attorney, Agent, or Firm* — Brett A. Klein; James D. Swendsen; Gregory Lars Gunnerson

(57) ABSTRACT

Embodiments relate to systems and methods for treating produced water and other contaminated water that can be customized or adapted to particular characteristics of the water and/or its contaminants or other contents while minimizing costs related to treating the water. In an embodiment, a method of treating produced water comprises degrading solid particles in the produced water using beneficial bacteria; filtering solid particles from the produced water; reducing pathogenic bacteria in the produced water by introducing ozone into the produced water; reducing contaminants in the produced water by passing the produced water through at least one filter; reducing salts in the produced water using a reverse osmosis system; and providing treated produced water.

19 Claims, 2 Drawing Sheets

(56) References Cited

U.S. PATENT DOCUMENTS

| | | | |
|---|---|---|---|
| 8,734,650 B2 * | 5/2014 | Bradley | 210/652 |
| 2007/0193950 A1 * | 8/2007 | Brown et al. | 210/610 |
| 2009/0095675 A1 * | 4/2009 | Runneboom et al. | 210/615 |
| 2009/0107917 A1 * | 4/2009 | Capehart | 210/638 |
| 2009/0311142 A1 * | 12/2009 | Burgess-Cassler | G01N 33/523 422/400 |
| 2010/0294719 A1 * | 11/2010 | Polizzotti | C02F 9/00 210/654 |
| 2011/0147304 A1 * | 6/2011 | Sauvignet et al. | 210/608 |
| 2011/0171719 A1 * | 7/2011 | Baldwin | C02F 1/50 435/235.1 |
| 2012/0152546 A1 * | 6/2012 | Polizzotti | E21B 43/40 166/305.1 |
| 2013/0126426 A1 * | 5/2013 | Jones et al. | 210/615 |
| 2013/0161260 A1 * | 6/2013 | Ferguson | G21F 9/06 210/682 |
| 2013/0193069 A1 * | 8/2013 | Aiken et al. | 210/615 |

* cited by examiner

SYSTEMS AND METHODS FOR TREATING PRODUCED WATER

RELATED APPLICATION

This application claims the benefit of U.S. Provisional Patent Application No. 61/705,452 filed Sep. 25, 2012, which is incorporated herein by reference in its entirety.

TECHNICAL FIELD

The present disclosure generally relates to the treatment of contaminated or byproduct water in, e.g., oil and gas industries and methodologies for extracting oil and gas reservoirs. More specifically, this disclosure relates to systems and methods for the treatment of produced water, which can be a byproduct of oil and gas extraction.

BACKGROUND

Produced water is a term used in the oil industry to describe water that is produced along with the desired oil and gas during the extraction process. Oil and gas reservoirs have a natural water layer (formation water) that lies under the hydrocarbons. Oil reservoirs frequently contain large volumes of water, and gas reservoirs tend to have smaller quantities of water. To achieve maximum oil recovery, additional water is injected into the reservoirs to help force the oil to the surface. Both the formation water and injected water are eventually produced along with the oil; the resulting water is called produced water. As oil and gas fields become depleted, the produced water content of the oil increases.

The combination of the formation water and injected water that is recovered during the oil and gas extraction process creates a surplus of produced water above and beyond that needed for continued oil extraction. That surplus of produced water is an industrial waste and must be properly treated and disposed.

Historically, produced water was disposed of in large evaporation ponds. However, this has become an increasingly unacceptable disposal method from both environmental and social perspectives. Produced water is considered an industrial waste and producers are required to treat and employ beneficial re-uses for produced water. Re-uses for produced water include direct injection, direct-use of untreated water, and discharge to surface waters. Both direct injection and discharge to surface waters requires the produced water to be treated to meet U.S. Environmental Protection Agency (EPA) standards, and is regulated by state governments under the Safe Drinking Water Act. However, to achieve these levels of water treatment, typically the oil and gas production industry lacks the capabilities at the satellite oil and gas well sites to properly treat the produced water to the EPA and Safe Drinking Water Act standards. This lack of capability at the satellite oil and gas well sites requires the shipment of the produced water to facilities capable of treating the produced water to the applicable EPA and Safe Drinking Water Act standards. Treating produced water creates a significant cost to the oil and gas industry.

SUMMARY

Embodiments relate to systems and methods for treating produced water and other contaminated water that can be customized or adapted to particular characteristics of the water and/or its contaminants or other contents while minimizing costs related to treating the water.

In an embodiment, a method of treating produced water comprises degrading solid particles in the produced water using beneficial bacteria; filtering solid particles from the produced water; reducing pathogenic bacteria in the produced water by introducing ozone into the produced water; reducing contaminants in the produced water by passing the produced water through at least one filter; reducing salts in the produced water using a reverse osmosis system; and providing treated produced water.

In an embodiment, a produced water treatment system comprises a dissolved air floatation device arranged to receive produced water for treatment; an ozone disinfection device arranged to receive treated produced water from the dissolved air flotation device; at least one filter arranged to receive treated produced water from the ozone disinfection device; and a reverse osmosis system arranged to receive treated produced water from the at least one filter.

The above summary of the various aspects and embodiments is not intended to describe each embodiment or every implementation of the improved process for treating produced water. Rather, the embodiments are chosen and described so that others skilled in the art may appreciate and understand the principles and practices of the improved process for treating produced water.

BRIEF DESCRIPTION OF THE DRAWINGS

The above and other objects, features and other advantages according to several embodiments of the present disclosure will be more clearly understood from the following detailed description taken in conjunction with the accompanying drawings, in which.

Figure 1:
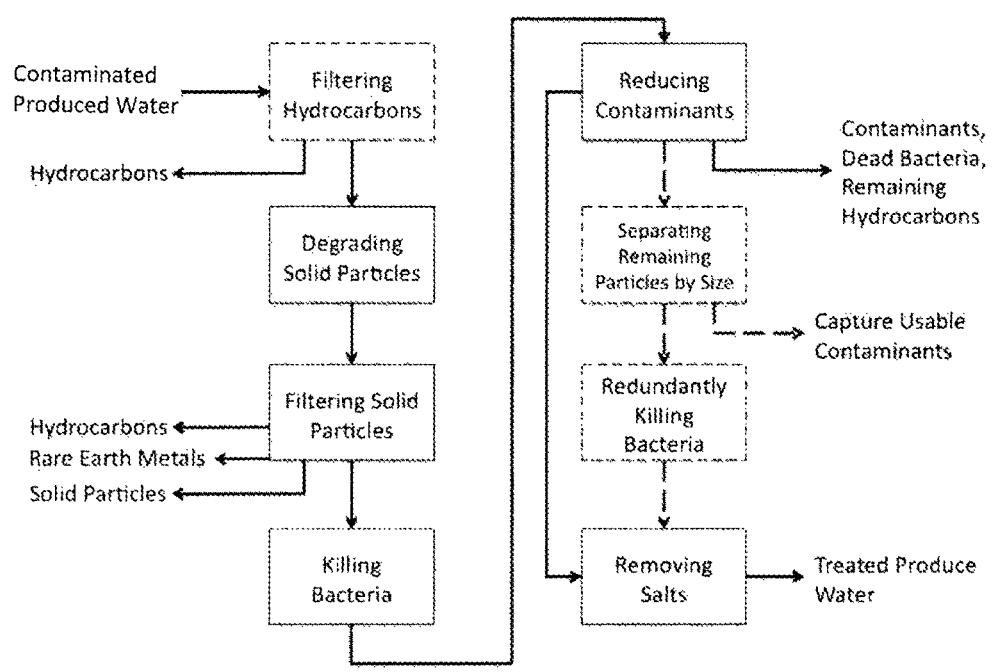
FIG. 1 is a block diagram of a system for treating produced water according to an embodiment.

While the system and method for treating produced water is amenable to various modifications and alternative forms, specifics thereof have been shown by way of example in the drawings and will be described in detail. It should be understood, however, that the intention is not to limit the system and method for treating produced water to the particular embodiments described. On the contrary, the system and method for treating produced water are to cover all modifications, equivalents, and alternatives.

DETAILED DESCRIPTION

Hereinafter, embodiments will be discussed and described with reference to the accompanying drawings. Embodiments depicted and described herein are examples which are not to be considered limiting with respect to the claims and/or other embodiments not specifically mentioned.

As depicted in FIG. 1, one embodiment of a method for treating produced water can comprises filtering hydrocarbons 101, degrading solid particles 102, filtering solid particles 103, killing bacteria 104, reducing contaminants 105, and removing salts 108. The method for treating produced water can also comprise: separating remaining particles by size 106 and/or redundantly killing bacteria 107.

In embodiments, one or more of the components depicted in FIG. 1 can be optional, including filtering hydrocarbons 101, separating remaining particles by size 106 and/or redundantly killing bacteria 107. In still other embodiments, additional components or steps can be added, the depicted and/or additional components or steps can be reordered, or other components or steps can be omitted. As such, the depiction in FIG. 1 is merely one example of one embodiment. The particular order or arrangement of components and actions can vary according to the particular characteristics of the produced or other water to be treated. In general, however, the components and steps are arranged to remove unwanted contaminants and reduce particle size of what remains to make each subsequent steps more effective. Thus, initial components and steps may generally remove large particles, and later components or steps may generally remove smaller and smaller particles, until the water has been sufficiently treated or meets an applicable or desired standard and can be discharged from the system.

For example, water to be treated may be produced water from an oil or gas industry process; water resulting from a mining or other industrial process; sewer, wastewater treatment, runoff or other water generated, produced or collected in a municipal or other water supply system; rainwater, lake, river, ocean or water from another body which has been polluted or which, for some other reasons, is to be treated; or virtually any other water or suitable fluid which has some content or contaminant that is undesirable or is to be removed.

In general, an advantage of embodiments of the systems and methods discussed herein is customizability of the systems and/or methods according to a particular application or need. For example, produced or contaminated water at a site in one geographic area can vary considerably from produced or contaminated water at another geographic area. Embodiments can take these differences into account, even if a base contaminant to be removed is the same, and adjust or adapt the system or method accordingly to provide the same or as similar result. In an embodiment, a desired result is water which is ground water dischargeable and does not require discharge into a holding pond or pool or other contained or controlled environment. For example, in one embodiment, a desired end product is water which meets applicable drinking water standards, such as those standards promulgated by the Environmental Protection Agency (EPA) (e.g., under the Safe Drinking Water Act, SDWA, currently 42 U.S.C. Chapter 6A, Subchapter XII—SAFETY OF PUBLIC WATER SYSTEMS, originally passed in 1974 and amended in 1986 and 1996) or another jurisdiction or authority, such as the State of California, which may set standards which are stricter than federal EPA standards, another state or local municipality, another country, a non-governmental organization, an international organization, or some other authority or advisory group or organization. These standards may evolve over time, e.g., as new or different contaminants are identified, and embodiments are configured to be adaptable with these evolutions. For example, the EPA currently provides a list of unregulated contaminants which are monitored, as well as contaminants which are candidates for regulation, at http://water.epa.gov/lawsregs/rulesregs/sdwa/currentregulations.cfm.

In FIG. 1, some type of contaminated or produced water is the input. At 101, hydrocarbons are optionally filtered. As previously mentioned, this filtering 101 can be omitted in embodiments. In general, this filtering aims to remove large hydrocarbons which can have large particle sizes or large clumps or other accumulations. In one embodiment, about 10% of the hydrocarbons in the produced water being treated can be removed at 101, though this percentage can be larger or smaller in other embodiments according to the particular characteristics of the produced water being treated.

At 102, the byproduct remaining from 101, or the input produced water if filtering 101 is omitted, is provided at 102 for degrading of solid particles. In one embodiment, beneficial bacteria can be added to or encouraged to grow within the produced water in order to feed on and thereby eliminate dead, pathogenic or other harmful or undesirable bacteria and/or organic matter in the produced water. The amount of degradation needed and/or accomplished at 102 can be quantified according to the biochemical oxygen demand (BOD) of the produced water, which is the amount of dissolved oxygen needed by aerobic biological organisms in the water to break down organic material present in a water sample at a certain temperature over a specific time period. In embodiments, BOD levels in the produced water can be reduced by at least about 70%, such as by about 80%, after 102 and/or after processing by a dissolved air flotation (DAF) device (refer to 110 in FIG. 2), which will be discussed herein below.

Additionally at 102, at 103 and/or elsewhere in the system or method, free oils present in the produced water can be floated off (e.g., caused to rise to the top of or otherwise separate from the produced water) and recaptured, such as for reuse in embodiments. This can be beneficial, e.g., in situations in which the produced water has been contaminated by a large amount of oil, gas or some other petroleum or other product which could have value in and of itself if recaptured. Oxygen and air bubbles can be added to the produced water, such as under pressure, to collect and float off the oils, hydrocarbons or other materials, while the BOD byproducts collect at and can be removed from the bottom. After DAF 110 and the degrading 102 and/or filtering 103, the size of particles remaining in the produced water is generally less than about 150 microns in one embodiment, though this can vary in other embodiments.

Also at 103, other contaminants or components of the produced water having value can be recaptured. For example, produced water may comprise rare earth elements or metals, such as Cerium; chemicals such as Rubidium; and/or micronutrients, all of which can have resale or other value if recaptured and collected. Thus, at 103, these rare earth metals, micronutrients, hydrocarbons, and other solid or other particles can be removed from the produced water and optionally recaptured for resale or reuse in embodiments.

At 104, ozone can be introduced into the produced water to kill bacteria. This can be accomplished in one embodiment by an ozone generator which is part of, coupled to, or follows DAF 110 (see FIG. 2). In embodiments, one or more of these steps can be carried out simultaneously or sequentially by a single device or stage, or by multiple devices. Additionally, one or more of the steps depicted in FIG. 1 can occur more than once, such as being carried out by the same device or multiple different devices. Thus, the particular steps and tasks depicted in FIG. 1 are not necessarily associated one-for-one with a particular device or component and need not occur in the exact sequence depicted, as some may be carried out at the same time or as part of the same treatment implemented by a particular device or devices.

At 105, additional contaminants, such as dead, pathogenic or other undesirable bacteria, and/or remaining hydrocarbons, can be reduced, such as by filtering. It can be desired to remove bacteria and other organics from the produced water, and from the system and its components generally, to reduce or prevent organics growth in the system that can be detrimental, such as by clogging filters or otherwise preventing optimal operation. In an embodiment, the filtering can be carried out an activated carbon filter, or some other off-the-shelf or customized filter selected according to a characteristic of the produced or source water being input, or some other relevant factor. In embodiments, following this and/or one or more filtering stages, particles remaining in the produced water are about 125 microns or less, such as less than about 100 microns in embodiments. Free oils in the produced water can be reduced by at least about 90% percent, such as by at least about 99% by this point in embodiments.

Other contaminants that may be present in the produced water also can be removed at 105. For example, the chemicals present or absent from water can vary by well or water source, in addition to according to whatever process or contaminant has affected the water. Therefore, the reducing at 105, as well as the filters or other components or processes implemented at other stages, can be customized or adapted in embodiments according to these chemicals or other components of the water. In embodiments, this can be done in a so-called "plug-and-play" configuration in which filters, devices, components or processes can be added, removed, selected or customized according to any particular application. For example, a water sample from a source in Texas may have dissolved salts of about 10,000 parts per million (ppm), while a water sample from North Dakota may have about 300,000 ppm of the same or similar salts. This variability has been anticipated in embodiments, such that the system can be adapted accordingly. The particular configuration used in any application or situation may vary in complexity and cost, but the ability to provide a flexible and adaptable system is an advantage with respect to conventional approaches.

At optional 106, any remaining particles in the produced water can be separated according to size, such as by a filter or filter bank in one embodiment. At optional 107, additional bacteria treatment can be carried out.

At 108, salts can be removed, such as monovalent and/or covalent salts. In one embodiment, about 100% of salts are removed, such as at least about 99%, or at least about 90% in other embodiments. In embodiments, salts remaining in the produced water do not exceed applicable drinking water standards, such as 500 ppm or less of salts. At this point, contaminants in generally in the produced water have been removed by at least about 90% from the input produced water, such as at least about 99 percent in one embodiment.

Figure 2:
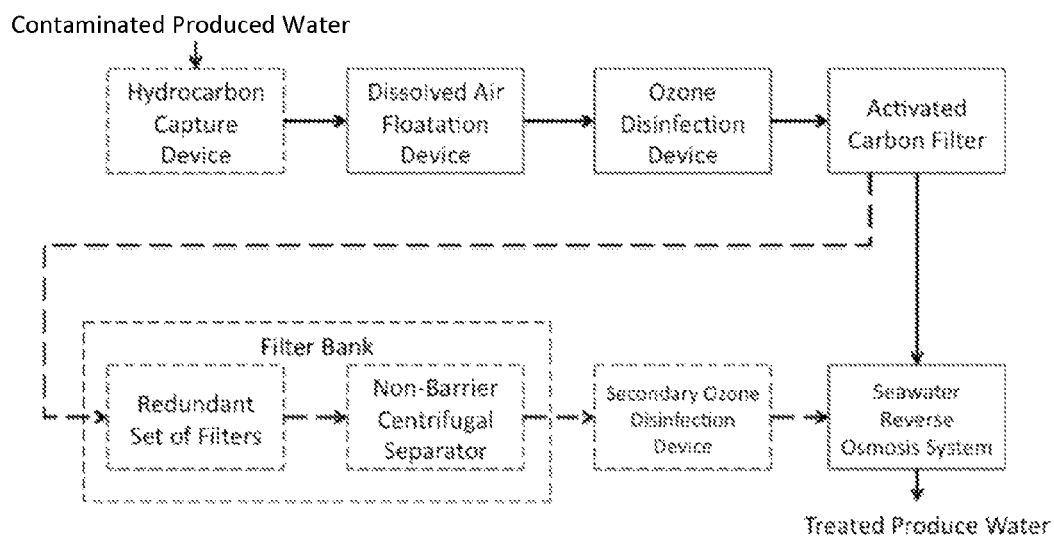
FIG. 2 is a block diagram of a treatment system for treating produced water according to an embodiment.

As shown in FIG. 2, a produced water treatment system can comprise a hydrocarbon capture device 109, a dissolved air flotation (DAF) device 110, an ozone disinfection device 110, an activated carbon filter 112, and a seawater reverse osmosis system 117 in an embodiment. The produced water treatment system can also comprise a filter bank 113. Filter bank 113 can comprise a redundant set of one or more filters 114 and/or a centrifugal separator 115. Centrifugal separator 115 can comprise a non-barrier centrifugal separator in an embodiment.

As previously discussed with respect to FIG. 1 but which is also true for FIG. 2, additional components or steps can be added, the depicted and/or additional components or steps can be reordered, or other components or steps can be omitted. As such, the depictions of FIGS. 1 and 2 are merely examples of one possible embodiment. The particular order or arrangement of components and actions can vary according to the particular characteristics of the produced or other water to be treated. In general, however, the components and steps are arranged to remove unwanted contaminants and reduce particle size of what remains to make each subsequent steps more effective. Thus, initial components and steps may generally remove large particles, and later components or steps may generally remove smaller and smaller particles, until the water has been sufficiently treated or meets an applicable or desired standard and can be discharged from the system.

In an embodiment, optional hydrocarbon capture device 109 carries out some or all of the filtering 101 to filter at least hydrocarbons from the produced water, as discussed above. Device 109 can comprise one or more hydrocarbon absorbent materials, such as polypropylene, synthetic fibers, fabric, organics, inorganics, and other materials, that absorb hydrocarbons that are in the produced water. Once the hydrocarbon absorbent materials are saturated, the hydrocarbon absorbent materials can be pressed to exude the stored hydrocarbons, which can then be captured in a quarantine tank or other holding device.

Degrading and Filtering Solid Particles (Dissolved Air Floatation Device)

DAF device 110 degrades (102) and filters (103) the solid particles from the produced water, which can come from device 109 in an embodiment. In one embodiment, DAF 110 dissolves oxygen-rich air in the produced water. The oxygen promotes beneficial bacteria growth, which degrades or reduces solid particles. DAF 110 can utilize an incline plane system distributing dissolved air evenly throughout DAF 110 for consistent solid particle degradation. An example of a DAF is one available from SIONIX. DAF 110 can be can be used off the self and/or adapted or customized in various embodiments.

The dissolved oxygen-rich air in DAF 110 tank can be released to form tiny bubbles that adhere to solid particles in the produced water, creating positive buoyancy which induces the solid particles to float to the surface, including hydrocarbons. Upon reaching the surface, the solid particles can be removed from DAF 110 tank by, e.g., skimming the surface of the tank.

DAF 110 can also utilize a spray system that introduces oxalic acid or another suitable material into DAF 110. The oxalic acid can induce precipitation of rare earth metals, which propagate at the bottom of the DAF 110 tank for recovery. Other similar processes can be implemented to recapture other resalable or reusable materials, such as hydrocarbons and micronutrients. The particular materials and processes used therefore can vary.

The produced water that is commonly generated by oil and gas drilling, for example, often includes quantities of filamentous and other bacteria which grow rapidly in the oxygen rich environment of DAF 110, and this bacteria can be removed or killed prior to final filtration of the treated produced water, as previously mentioned, in order to avoid clogging the filter(s) or otherwise compromising the operation and/or effectiveness of the system or the quality of the treated produced water end product.

Ozone disinfection device 111 can kill bacteria (104) in the produced water. In one embodiment, ozone disinfection device 111 introduces ozone into the produced water, killing bacteria (104) and degrading other contaminants within the produced water.

Activated carbon filter 112 reduces (105) the contaminants in the produced water. In embodiment, a filter 112 can comprise a filter other than an activated carbon filter, according to a particular application or contaminant type in the produced water. In one embodiment, the produced water is passed through filter 112, and filter 112 captures contaminants, dead bacteria, and remaining hydrocarbons, allowing the remaining produced water to flow through.

Separating Remaining Particles by Size (Filter Bank)

Optionally, a filter bank 113 can be included in the system to separate remaining particles by atomic size and/or provide additional filtering. Filter bank 113 can comprise a redundant set of filters 114 and/or a centrifugal separator 115, such as a non-barrier centrifugal separator, in one embodiment, or some other filter, filter set, separator or components. The filters can be selected and/or arranged to capture usable or resalable contaminants by particle size, e.g., micro, nano, etc. In other words, filter(s) 114 of filter bank 113 can utilize specific pore sizes corresponding to the desired particle size, thereby capturing the desired contaminants. Centrifugal separator 115 can further separate particles for the purposes of additional filtering and separation of contaminants and other contents of the produced water.

Redundantly Killing Bacteria (Secondary Ozone Disinfection Device 116)

Optional secondary ozone disinfection device 116 can provide redundant treatment of bacteria (107) that may be present in the produced water if, e.g., ozone disinfection device 110 did not kill or other components did not remove all or a desired amount of bacteria in the produced water. Secondary ozone disinfection device 116 introduces ozone into the produced water, killing bacteria and degrading other contaminants within the produced water in embodiments. Other redundant treatment and/or filtration devices and components also can be used in other embodiments.

A high-output seawater reverse osmosis system 117 can be utilized in the system to remove the often high concentrations of salt found in produced water (108). In one embodiment, system 117 can comprise a spiral-wound filter, such as one available from CRANE ENVIRONMENTAL, though in other embodiments other sources and/or filter types can be used.

Additional components, devices and processes can be added in embodiments for other specialized or desired tasks. For example, in embodiments radioactive materials may be present in the produced water and can be separated, removed and segregated (e.g., in suitable holding tanks, storage containers or other containers). The plug-and-play aspect of the system makes it convenient to add features to address particular produced water content or geological concerns, which can be ascertained initially by an analysis of the produced or other water, with filters and other devices then selected and various flows and treatments adjusted to accommodate the results of the analysis.

In embodiments, the amounts of materials (e.g., ozone or oxygen) and types of filters can vary or be customized according to an particular application. For example, the amount of ozone introduced by device 111 at 104 can be set or adjusted according to produced water flow flows within the system and/or at the site where treatment is taking place in order to meet gallons per minute or other flow rates taking place. In embodiments, this and other management, monitoring and control features and functions can be carried out by a control unit forming part of or coupled to the system of FIG. 2. The control unit can monitor flow rates, concentrations and other factors and provide automatic adjustments to various features or alerts in order for a technician or attendant to be summoned to interact with the system. In one embodiment, the control unit comprises a supervisory control and data acquisition (SCADA) system and related software to monitor and control the various components and steps of the system and method. For example, in one embodiment the control unit can be programmed to set and control backflush times for filters, devices and systems and can manage and monitor each component of the system of FIG. 2 in real time. A technician, engineer or attendant can have access to and/or communicate with the control unit via a computer, tablet, laptop, smartphone or other communication device and can receive messages and alerts and/or interact with and control the system via one or more of those same devices if problems occur or the control unit detects that the system is not operating as desired or intended.

The preceding description has been presented only to illustrate and describe various examples or illustrations of the embodiments. It is not intended to be exhaustive or limit to any precise form disclosed. Many modifications and variations are possible in light of the above teaching. Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Thus, particular embodiments of the subject matter have been described. Other embodiments are within the scope of the following claims.

What is claimed is:

1. A method of treating produced water comprising:
    configuring a filtration system by arranging processing steps in a selected order to increase efficiency based on particular water conditions, the processing steps comprising:
        degrading solid particles in the produced water using beneficial bacteria;
        filtering solid particles from the produced water;
        reducing pathogenic bacteria in the produced water by introducing ozone into the produced water;
        reducing contaminants in the produced water by passing the produced water through at least one filter;
        reducing salts in the produced water using a reverse osmosis system; and
        separating particles in the produced water by size by passing the produced water through at least one filter and a centrifugal separator;
    treating the produced water with the filtration system configured in the selected order; and
    providing treated produced water.

2. The method of claim 1, wherein the processing steps further comprise filtering hydrocarbons from the produced water.

3. The method of claim 2, wherein filtering hydrocarbons comprises:
    absorbing hydrocarbons by passing the produced water through absorbent materials;
    pressing the hydrocarbons from the absorbent materials; and
    capturing the pressed hydrocarbons in a container.

4. The method of claim 1, wherein degrading solid particles comprises:
    dissolving oxygen-rich air in the produced water to promote growth of the beneficial bacteria.

5. The method of claim 1, wherein filtering solid particles comprises:
    dissolving air in the produced water under pressure; and
    releasing the air in the produced water at atmospheric pressure such that the released air adheres to solid particles in the produced water and rises to a surface of the produced water with the adhered solid particles.

6. The method of claim 1, wherein reducing contaminants comprises passing the produced water through an activated carbon filter system.

7. The method of claim 1, wherein the processing steps further comprise providing an additional bacteria reduction in the produced water.

8. The method of claim 7, wherein providing an additional bacteria reduction comprises introducing additional ozone into the produced water.

9. A produced water treatment system comprising:
a systematic filtration system comprising processing elements that can be arranged in a selected order to increase efficiency configured based on particular water conditions, the processing elements comprising:
a dissolved air floatation device arranged to receive produced water for treatment;
an ozone disinfection device arranged to receive treated produced water from the dissolved air flotation device;
at least one filter arranged to receive treated produced water from the ozone disinfection device;
a reverse osmosis system arranged to receive treated produced water from the at least one filter;
a filter bank arranged to receive treated produced water from the at least one filter; and
a centrifugal separator arranged to receive treated produced water from the filter bank.

10. The system of claim 9, wherein the processing elements further comprise a hydrocarbon capture device arranged to receive produced water for treatment, wherein the produced water for treatment received by the dissolved air flotation device is treated produced water from the hydrocarbon capture device.

11. The system of claim 9, wherein the filter bank comprises a redundant set of filters.

12. The system of claim 9, wherein the processing elements further comprise a secondary ozone disinfection device.

13. The system of claim 9, wherein the at least one filter comprises an activated carbon filter.

14. A method of treating produced water comprising:
configuring a filtration system by arranging processing steps in a selected order to increase efficiency based on particular water conditions, the processing steps comprising:
degrading solid particles in the produced water using beneficial bacteria;
filtering solid particles from the produced water;
reducing pathogenic bacteria in the produced water by introducing ozone into the produced water;
reducing contaminants in the produced water by passing the produced water through at least one filter;
reducing salts in the produced water using a reverse osmosis system; and
further reducing the pathogenic bacteria in the produced water by introducing additional ozone into the produced water;
treating the produced water with the filtration system configured in the selected order; and
providing treated produced water.

15. The method of claim 14, wherein the processing steps further comprise filtering hydrocarbons from the produced water.

16. The method of claim 15, wherein filtering hydrocarbons comprises:
absorbing hydrocarbons by passing the produced water through absorbent materials;
pressing the hydrocarbons from the absorbent materials; and
capturing the pressed hydrocarbons in a container.

17. The method of claim 14, wherein degrading solid particles comprises:
dissolving oxygen-rich air in the produced water to promote growth of the beneficial bacteria.

18. The method of claim 14, wherein filtering solid particles comprises:
dissolving air in the produced water under pressure; and
releasing the air in the produced water at atmospheric pressure such that the released air adheres to solid particles in the produced water and rises to a surface of the produced water with the adhered solid particles.

19. The method of claim 14, wherein reducing contaminants comprises passing the produced water through an activated carbon filter system.

* * * * *